(12) United States Patent
Joung et al.

(10) Patent No.: US 9,985,844 B2
(45) Date of Patent: May 29, 2018

(54) METHOD AND APPRATUS FOR MEASURING A THROUGHPUT OF A BACKHAUL NETWORK

(71) Applicant: Qucell Networks Co., Ltd., Seongnam-si, Gyeonggi-do (KR)

(72) Inventors: Jin Soup Joung, Seongnam-si (KR); Seung Hwan Ji, Seongnam-si (KR); Oh Keol Kwon, Seongnam-si (KR); Ro Mi Choe, Anyang-si (KR)

(73) Assignee: Qucell Networks Co., Ltd., Seongnam-si (KR)

( * ) Notice: Subject to any disclaimer, the term of this patent is extended or adjusted under 35 U.S.C. 154(b) by 153 days.

(21) Appl. No.: 15/049,583

(22) Filed: Feb. 22, 2016

(65) Prior Publication Data
US 2017/0230255 A1    Aug. 10, 2017

(30) Foreign Application Priority Data

Feb. 4, 2016  (KR) .......................... 10-2016-0014104

(51) Int. Cl.
*H04L 12/24* (2006.01)
*H04L 12/26* (2006.01)

(52) U.S. Cl.
CPC ............ *H04L 41/147* (2013.01); *H04L 43/08* (2013.01); *H04L 43/0882* (2013.01); *H04L 43/0888* (2013.01)

(58) Field of Classification Search
CPC ... H04L 41/147; H04L 43/0894; H04L 41/14; H04L 47/147
See application file for complete search history.

(56) References Cited

U.S. PATENT DOCUMENTS

| 2008/0144511 | A1* | 6/2008 | Marcondes ............. H04L 45/00 370/236 |
| 2013/0034043 | A1* | 2/2013 | Yu ....................... H04W 72/085 370/315 |

* cited by examiner

*Primary Examiner* — Feben M Haile
(74) *Attorney, Agent, or Firm* — Novick, Kim & Lee, PLLC; Jae Youn Kim

(57) ABSTRACT

Provided is a method for measuring a throughput of a backhaul network. The method includes: estimating an available bandwidth of a backhaul network; determining the sizes (P) of packet trains by using the estimated available bandwidth; and calculating a virtual throughput of the backhaul network by using at least one parameter by transmitting N packet trains having the determined sizes to the backhaul network (N is a natural number that is equal to or greater than 2).

16 Claims, 5 Drawing Sheets

METHOD AND APPRATUS FOR MEASURING A THROUGHPUT OF A BACKHAUL NETWORK

BACKGROUND OF THE INVENTION

1. Field of the Invention

The present invention relates to measurement of a backhaul throughput in a mobile communication system, and more particularly to a backhaul throughput measuring technology based on a prior estimation of the available bandwidth of a backhaul.

2. Description of the Related Art

In the field of mobile communication systems, a network section between a base station and a core network, that is, a network section in which a base station collects voices or data and transfers the voices or data to a backbone network of a communication provider is called a backhaul. Because a terminal should be connected finally to a backbone network to be connected to the Internet, existence of a backhaul is essential. Because the throughput of a backhaul is not always maintained at a constant value but is changed according to the amount of data traffic or the like, the throughput of a backhaul may be monitored in a small-sized cell. The most basic throughput measuring method is to maximally use a network resource actually. This may be implemented by uploading a file to a file transfer protocol (FTP) server or downloading a file from the FTP server and then measuring data transmission rate. Because this method allows an accurate measurement of throughput but is used in many network resources for the purpose of measuring throughput, it may influence the performance of another user terminal that shares a network resource.

SUMMARY OF THE INVENTION

An object of the present invention is to provide a method and an apparatus for measuring a throughput of a backhaul, by which the throughput of a backhaul can be measured by using a small number of network resources.

Another object of the present invention is to provide a method and an apparatus for measuring a throughput of a backhaul, by which the throughput of a backhaul can be measured even though information on the performance of the backhaul is not provided.

The technical objects of the present invention are not limited to the above-mentioned ones, and the other unmentioned technical objects will become apparent to those skilled in the art from the following description.

In accordance with an aspect of the present invention, there is provided a method for measuring a throughput of a backhaul network, the method including: estimating an available bandwidth of a backhaul network; determining the sizes (P) of packet trains by using the estimated available bandwidth; and calculating a virtual throughput of the backhaul network by using at least one parameter by transmitting N packet trains having the determined sizes to the backhaul network (N is a natural number that is equal to or greater than 2).

Estimating an available bandwidth of a backhaul network may include estimating the available bandwidth of the backhaul network by using a pathchirp manner.

Estimating an available bandwidth of a backhaul network may include obtaining M available bandwidth estimation values ($b_1, b_2, b_3, \ldots,$ and $b_M$) by estimating available bandwidths of the backhaul network M times (here, M is a natural number that is equal to or greater than 1).

Determining the sizes (P) of packet trains may include determining the size of the packet trains by using the M available bandwidth estimation values ($b_1, b_2, b_3, \ldots,$ and $b_m$), a selected time interval ($t_i$) from one transmission start time of a packet train to a transmission start time of the next packet train of the N packet trains, and an allowable intrusiveness ($l_a$) of the backhaul network.

Determining the size of the packet trains by using the M available bandwidth estimation values ($b_1, b_2, b_3, \ldots,$ and $b_m$), N, a selected time interval ($t_i$), and an allowable intrusiveness ($l_a$) of the backhaul network may include obtaining a representative bandwidth value ($b_{rep}$) that represents the M available bandwidth estimation values ($b_1, b_2, b_3, \ldots,$ and $b_m$).

Determining the size of the packet trains by using the M available bandwidth estimation values ($b_1, b_2, b_3, \ldots,$ and $b_m$), N, a selected time interval ($t_i$), and an allowable intrusiveness ($l_a$) of the backhaul network further may include determining the sizes (P) according to the following equation:

$$P = \frac{b_{rep} I_a t_i (N-1)}{N - I_a}.$$

Determining the size of the packet trains by using the M available bandwidth estimation values ($b_1, b_2, b_3, \ldots,$ and $b_m$), N, a selected time interval ($t_i$), and an allowable intrusiveness ($l_a$) of the backhaul network further may include obtaining a target measurement bandwidth (b') by multiplying the representative bandwidth value ($b_{rep}$) and a margin coefficient ($\alpha$) (here, $\alpha$ is a rational number that is equal to or greater than 1) and determining the sizes (P) of the packet trains according to the following equation:

$$P = \frac{b' I_a t_i (N-1)}{N - I_a}.$$

Calculating a virtual throughput of the backhaul network by using at least one parameter by transmitting N packet trains having the determined sizes to the backhaul network may include calculating a value obtained by dividing (P) by a time period ($\Delta T$) taken until a packet train is transmitted to and received by the backhaul network as a virtual throughput.

Calculating a virtual throughput of the backhaul network by using at least one parameter by transmitting N packet trains having the determined sizes to the backhaul network may include: calculating values obtained by dividing P by time periods ($\Delta T$) taken until the N packet trains are transmitted to and received by the backhaul network as virtual throughputs; and obtaining an average virtual throughput value obtained by averaging two or more virtual throughputs of the calculated N virtual throughputs.

The method further includes: determining calculating a value obtained by dividing the average data transmission rate ($r_{avg}$) of the N packet trains by the average virtual throughput value as an intrusiveness (I) that influences on the backhaul network by the measurement of the throughput of the backhaul network.

The representative bandwidth value ($b_{rep}$) may be an average bandwidth value ($b_{avg}$) that is obtained by averaging the M available bandwidth estimation values ($b_1, b_2, b_3, \ldots,$ and $b_m$).

In accordance with another aspect of the present invention, there is provided a method for determining the size of a packet train for measurement of a throughput of a backhaul network, the method including: estimating an available bandwidth of a backhaul network; determining the sizes of N packet trains necessary for transmitting the packet trains to the backhaul network (here, N is a natural number that is equal to or greater than 2), and determining the sizes (P) of packet trains may include determining the size of the packet trains (P) by using the estimated available bandwidth, N, a selected time interval ($t_i$) from one transmission start time of a packet train to a transmission start time of the next packet train of the N packet trains, and an allowable intrusiveness ($l_a$) of the backhaul network.

Estimating an available bandwidth of a backhaul network may include obtaining M available bandwidth estimation values ($b_1$, $b_2$, $b_3$, . . . , and $b_M$) by estimating available bandwidths of the backhaul M times (here, M is a natural number that is equal to or greater than 1), and determining the sizes (P) of the packet trains may further include: obtaining an average bandwidth value (bang) by averaging the M available bandwidth estimation values ($b_1$, $b_2$, $b_3$, . . . , and $b_M$), obtaining a target measurement bandwidth (b') by multiplying the representative bandwidth value ($b_{rep}$) and a margin coefficient ($\alpha$) (here, $\alpha$ is a rational number that is equal to or greater than 1), and determining the sizes (P) of the packet trains according to the following equation $$P = \frac{b' I_a t_i (N-1)}{N - I_a}.$$

In accordance with another aspect of the present invention, there is provided an apparatus for measuring a throughput of a backhaul network, the apparatus including: a storage unit that stores information on the number (N) of packet trains that will be transmitted to the backhaul network (here, N is a natural number that is equal to or greater than 2); and a processor configured to estimate an available bandwidth of the backhaul network, to determine the sizes (P) of the packet trains by using the estimated available bandwidth, and to calculate a virtual throughput of the backhaul network by using at least one parameter measured as the N packet trains having the determined sizes are transmitted to the backhaul network.

The processor may be further configured to obtain M available bandwidth estimation values ($b_1$, $b_2$, $b_3$, . . . , and $b_M$) by estimating available bandwidths of the backhaul network M times (here, M is a natural number that is equal to or greater than 1).

The storage unit may further store information on a selected time interval ($t_i$) from one transmission start time of a packet train to a transmission start time of the next packet train of the N packet trains, and an allowable intrusiveness ($l_a$) of the backhaul network, and the processor may be further configured to determine the sizes of the packet trains by using the M available bandwidth estimation values ($b_1$, $b_2$, $b_3$, . . . , and $b_m$), N, a selected time interval ($t_i$), and an allowable intrusiveness ($l_a$) of the backhaul.

The processor may be further configured to obtain an average bandwidth $b_{avg}$ by averaging the M available bandwidth estimation values ($b_1$, $b_2$, $b_3$, . . . , and $b_m$), to obtain a target measurement bandwidth b' by multiplying the average bandwidth value $b_{avg}$ and a margin coefficient ($\alpha$) (here, $\alpha$ is a rational number that is equal to or greater than 1), and to determine the sizes P of the packet trains according to the following equation:

$$P = \frac{b' I_a t_i (N-1)}{N - I_a}.$$

The processor may be further configured to calculate a value obtained by dividing P by a time period ($\Delta T$) taken until a packet train is transmitted to and received by the backhaul network as a virtual throughput.

The processor may be further configured to calculate the values obtained by dividing P by time periods ($\Delta T$) taken until the N packet trains are transmitted to and received by the backhaul network as N virtual throughputs of the backhaul network, and to obtain an average virtual throughput value obtained by averaging two or more virtual throughputs of the calculated N virtual throughputs.

The processor may be further configured to determine calculating the average data transmission rate ($r_{avg}$) of the N packet trains by the average virtual throughput value as an intrusiveness (I) that influences on the backhaul network by the measurement of the throughput of the backhaul network.

In accordance with another aspect of the present invention, there is provided an apparatus for measuring a throughput of a backhaul network, the apparatus including: a storage unit that stores information on the number (N) of packet trains that will be transmitted to the backhaul network (here, N is a natural number that is equal to or greater than 2); a communication unit; and a processor configured to determine the sizes (P) of the packet trains by using an estimated available bandwidth of the backhaul network, and to transmit the N packet trains having the determined sizes to the backhaul network through the communication unit.

According to the embodiments of the present invention, a technical effect of reducing an influence of measurement of a throughput of a backhaul on other network elements by measuring the throughput using a small number of backhaul resources can be achieved.

According to the embodiments of the present invention, a technical effect of preventing the user (network operator) from possibly measuring an inaccurate throughput through setting of a wrong value or preventing an unnecessarily large number of network resources from being measured, by determining a setting value for measuring a throughput of a backhaul through preliminary measurement of the backhaul can be achieved.

According to some embodiments of the present invention, a technical effect of obtaining a setting value suitable for a network environment to enable a more accurate measurement of a backhaul throughput, by correcting a measurement setting value using the statistical values of the measurement result can be achieved.

DETAILED DESCRIPTION OF THE INVENTION

The above and other aspects, features and advantages of the invention will become apparent from the following description of the following embodiments given in conjunction with the accompanying drawings. However, the present invention is not limited to the embodiments disclosed below, but may be implemented in various forms. The embodiments of the present invention is provided to make the disclosure of the present invention complete and fully inform those skilled in the art to which the present invention pertains of the scope of the present invention.

The terminologies used herein are provided only to describe specific embodiments, and are not intended to limit the present invention. For example, a certain constituent element expressed in a singular form should be understood as the concept of including a plurality of those constituent elements as long as it explicitly means only a single constituent element in the context. Further, in the specification of the present invention, the terms "including" or "having" only designate that there are present features, numbers, steps, operations, elements, parts, or combinations thereof, and do not exclude a possibility of presence or addition of one or more other features, numbers, steps, operations, elements, parts, or combinations thereof. In the embodiments described in the specifications, a 'module' or "unit" may refer to a functional part that performs at least one function or operation.

In addition, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

Hereinafter, exemplary embodiments of the present invention will be described in more detail with reference to the accompanying drawings. Meanwhile, a detailed description of widely known functions or configurations will be omitted when they may make the essence of the present invention unnecessarily unclear.

Figure 1:
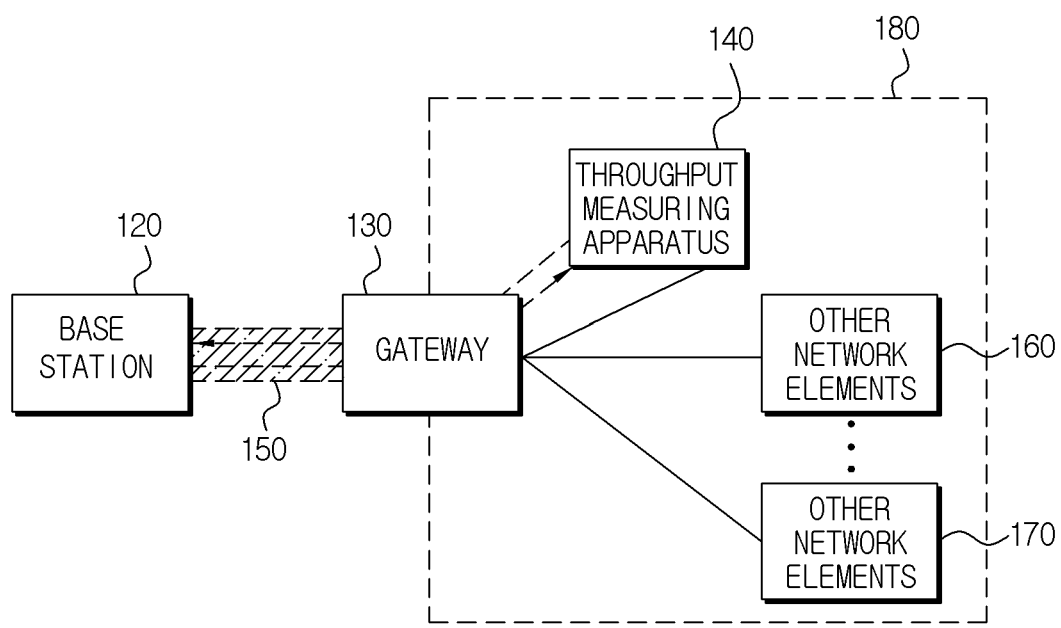
FIG. 1 is a view illustrating an embodiment of a configuration of a network that is connected to a backhaul network such that a throughput measuring apparatus according to an embodiment of the present invention measures a throughput of the backhaul network.

FIG. 1 is a view illustrating an embodiment of a configuration of a network that is connected to a backhaul network such that a throughput measuring apparatus according to an embodiment of the present invention measures a throughput of the backhaul network.

Referring to FIG. 1, the throughput measuring apparatus 140 is connected to a gateway 130 to measure a throughput of a backhaul network 150 corresponding to a network section between a base station 120 and a core network 180 that is a backbone network. Hereinafter, the backhaul network 150 will be collectively referred to as a backhaul network 150. In the illustrated embodiment of the present invention, the throughput measuring apparatus 140 is connected to the gateway 130 for measurement of a throughput, but an object to which the throughput measuring apparatus 140 is connected for measurement of a throughput is not limited to the gateway 130. For example, the throughput measuring apparatus 140 is connected one of other network elements of the core network 180 to measure a throughput of the backhaul network 150.

In order to provide a radio communication service for terminals that access to the base station 120, the base station 120 called eNodeB may perform functions such as radio resource management (RRM), radio bearer control such as setup, change, and release of radio resources, terminal status management, connection management control between an MME and terminals, radio admission control, collection and evaluation of measurement values, dynamic resource allocation (scheduling), IPs, compression/decompression of IP headers, access hierarchy security, selection of an MME, user data routing to the gateway 130, transmission of paging messages from an MME, and transmission of broadcasts. In some embodiments of the present invention, the base station 120 may include a small-sized cell base station such as a macro base station, a micro cell, a pico cell, or a femto cell. The gate way 130 manages mobility in a user plane and functions as a border point between a radio access network (RAN) corresponding to a radio section between a terminal and the base station 120 and a core network 180. The gateway 130 may be also responsible for processing of handovers between the base stations 130. In some embodiments of the present invention, the gateway 130 may be a serving gateway (S-GW) in a long term evolution/long term evolution advanced (LTE/LTE-A).

The throughput measuring apparatus 140 may transmit packet trains to the base station 120 through the backhaul network 150, and the base station 120 may receive the packet trains to perform various measurements and calculations according to the present invention, and transmit the measured parameters and/or calculated results to the throughput measuring apparatus 140. In some implementations, the base station 120 may transmit packet trains to the throughput measuring apparatus 140 through the backhaul network 150, and the throughput measuring apparatus 140 may receive the packet trains to perform various measurements and calculations according to the present invention. In some implementations, the throughput measuring apparatus 140 transmits packet trains to the base station 120 through the backhaul network 150, the base station 120 receives the packet trains to perform measurements according to the present invention and transmits the measurement values to the throughput measuring apparatus 140, and the throughput measuring apparatus 140 in turn may calculate the throughput of the backhaul network 150 based on the received measurement values.

Figure 2:
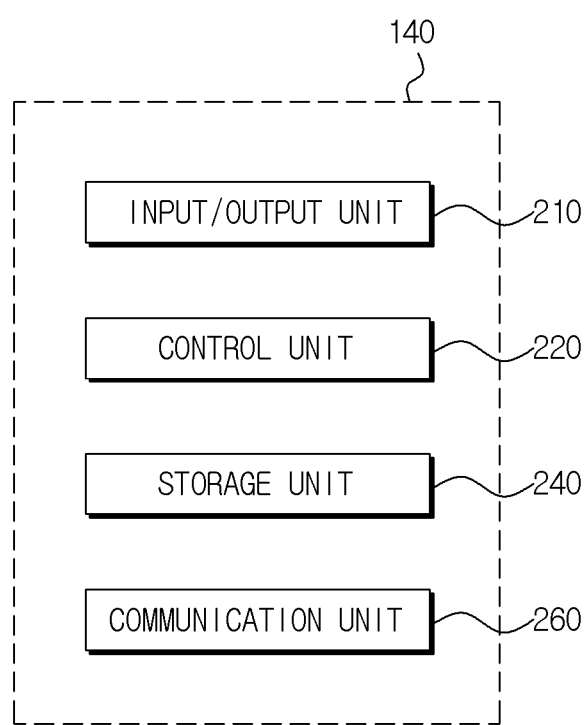
FIG. 2 is a view illustrating an embodiment of the throughput measuring apparatus for measuring a throughput of the backhaul network according to the present invention.

FIG. 2 is a view illustrating an embodiment of the throughput measuring apparatus for measuring a throughput of the backhaul network according to the present invention.

As illustrated in FIG. 2, the throughput measuring apparatus 140 may include an input/output unit 210, a control unit 220, a storage unit 240, and a communication unit 260. The elements illustrated in FIG. 2 neither reflect all functions of the throughput measuring apparatus 140 nor are essential, so it should be noted that the throughput measuring apparatus 140 may include a larger number of elements or a smaller number of elements.

The input/output unit 210 may include hardware and software modules for inputting information on one or more setting parameters necessary for measuring a throughput of the backhaul network 150 and inputting user commands. In some implementations, the input/output unit 210 may include a keyboard, a keypad, a touchpad, and a mouse of a computer, but an embodiment of the input/output unit 210 is not limited thereto. For example, the input/output unit 210 may include a graphic user interface that may be controlled by using the above-mentioned input units. The input/output unit 210 may include a display for displaying information on the above-mentioned one or more setting parameters and various measurement values, estimation values, and calculation values acquired according to various embodiments of the present invention in response to the user command, and an output unit such as a print. The display may include various displays such as an LCD display, an LED display, an AMOLED display, and a CRT display, but the kinds of the display are not limited thereto.

The control unit 220 is generally configured to control an overall operation of the throughput measuring apparatus 140. For example, the control unit 220 may be configured to control the input/output unit 210 and the storage unit 240 such that information on various setting parameters necessary for carrying out the present invention, such as the number N of packet trains that will be transmitted to the backhaul network 150, the allowable intrusiveness $I_a$ of the backhaul network 150 and information on various measurement values, estimation values, and calculation values acquired according to various embodiments of the present invention, which are input through the input/output unit 210, may be stored in the storage unit 240 or output. The control unit 220 may be configured to estimate an available bandwidth of the backhaul network 150, for example, by using a pathchirp manner, determines the sizes P of the packet trains by using the estimated available bandwidth, transmits the N packet trains having the determined sizes, respectively, to the backhaul network 150 through the communication unit 260, and calculate a virtual throughput of the backhaul network 150 by using the one or more measured parameters.

In some implementations, the control unit 220 may be further configured to estimate available bandwidths of the backhaul network 150 M times to obtain M available bandwidth estimation values $b_1, b_2, b_3, \ldots,$ and $b_m$ (here, M is a natural number that is equal to or greater than 1). The control unit 220 may be further configured to determine the size of the packet trains by using the M available bandwidth estimation values $(b_1, b_2, b_3, \ldots,$ and $b_m)$, a selected time interval $t_i$ from one transmission start time of a packet train to a transmission start time of the next packet train of the N packet trains, and an allowable intrusiveness $I_a$ of the backhaul network 150. In some implementations, the control unit 220 may be further configured to obtain an average bandwidth $b_{avg}$ by averaging the M available bandwidth estimation values $(b_1, b_2, b_3, \ldots,$ and $b_m)$, obtains a target measurement bandwidth b' by multiplying the average bandwidth value $b_{avg}$ and a margin coefficient α (here, α is a rational number that is equal to or greater than 1), and determine the sizes P of the packet trains according to an equation of $P=b' \cdot I_a \cdot t_i \cdot (N-1)/(N-I_a)$.

The control unit 220 may be further configured to calculate a value obtained by dividing P by a time period ΔT taken until a packet train is transmitted to and received by the backhaul network 150 as a virtual throughput. In some implementations, the control unit 220 may be further configured to calculate the values obtained by dividing P by time periods ΔT taken until the N packet trains are transmitted to and received by the backhaul network 150 as N virtual throughputs of the backhaul network 150, and obtain an average virtual throughput value obtained by averaging two or more virtual throughputs of the calculated N virtual throughputs. In some implementations, the control unit 220 may be further configured to calculate a value obtained by dividing an average data transmission rate $r_{avg}$ of the N packet trains by the virtual throughput value as an intrusiveness I that is influenced on the backhaul network 150 by the measurement of the throughput of the backhaul network 150.

In some implementations, the throughput measuring apparatus 140 may allow a base station connected to an end of the backhaul network 150 to transmit packet trains instead of directly transmitting N packet trains to the backhaul network 150, and may receive the transmitted packet trains to measure the above-mentioned various parameters. When the throughput measuring apparatus 140 transmits N packet trains to the backhaul network 150, the base station 120 connected to an end of the backhaul network 150 or the like may receive the packet trains to measure the above-mentioned various parameters and transmit the measured parameters to the throughput measuring apparatus 140.

In a hardware aspect, the control unit 220 may be implemented by using at least one of an application specific integrated circuit (ASIC), a digital signal processor (DSP), a digital signal processing device (DSPD), a programmable logic device (PLD), a field-programmable gate array (FPGA), a processor, a controller, a micro-controller, and a microprocessor. The control unit 220 may be implemented by a firmware/software module that may be executed on the above-mentioned hardware platform. In this case, the firmware/software module may be implemented by one or more software applications written in a proper programmable language.

The storage unit 240 may store software/firmware for an operation of the control unit 220 and/or data, and may also store data that are input and output. The storage unit 240 may store information on at least one setting parameter necessary for measuring a throughput of the backhaul network 150 and information on various measurement values, estimation values, and calculation values that are acquired according to various embodiments of the present invention. The storage unit 240 may include at least one type of storage medium of a flash memory type, a hard disk type, a multimedia card micro type, or a card type memory (for example, an SD or XD memory), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. In an embodiment of the present invention, the throughput measuring apparatus 140 may interwork with a web storage that performs a storage function on the Internet separately from or in association with the storage unit 240.

The communication unit 260 may be configured to implement a communication protocol that supports the throughput measuring apparatus 140 such that the throughput measuring apparatus 140 transmits and receives packets to the base station 120 through the backhaul network 150. In this case, the communication protocol may be implemented by proper hardware and/or firmware. In some implementations, the communication protocol may include a transmission control protocol/internet protocol (TCP/IP), and/or a user datagram protocol (UDP). The communication unit 260 may be also configured to implement a communication protocol that supports the throughput measuring apparatus 140 such that the throughput measuring apparatus 140 performs wired/wireless communications with the base station 120. When the throughput measuring apparatus 140 is configured to perform wireless communications with the base station 120, the communication unit 260 may be implemented by hardware and/or firmware that implements various radio access technologies (RATs) including LTE/LTE-A. In some implementations, the communication unit 260 may be implemented to satisfy a wireless communication interface standard such as LTE-Ue. In some implementations, the communication unit 260 may implement RATs that are employed in a GSM network, a 2G wireless communication network such as a CDMA network, a wireless internet network such as a WiFi network, a portable internet network such as a WiBro network and a WiMax network, or a wireless communication network that supports transmission of packets, and may include functions/features of a communication unit of a mobile communication device used in such as wireless communication network, but the functions of the communication unit 260 is not limited thereto.

Figure 3:
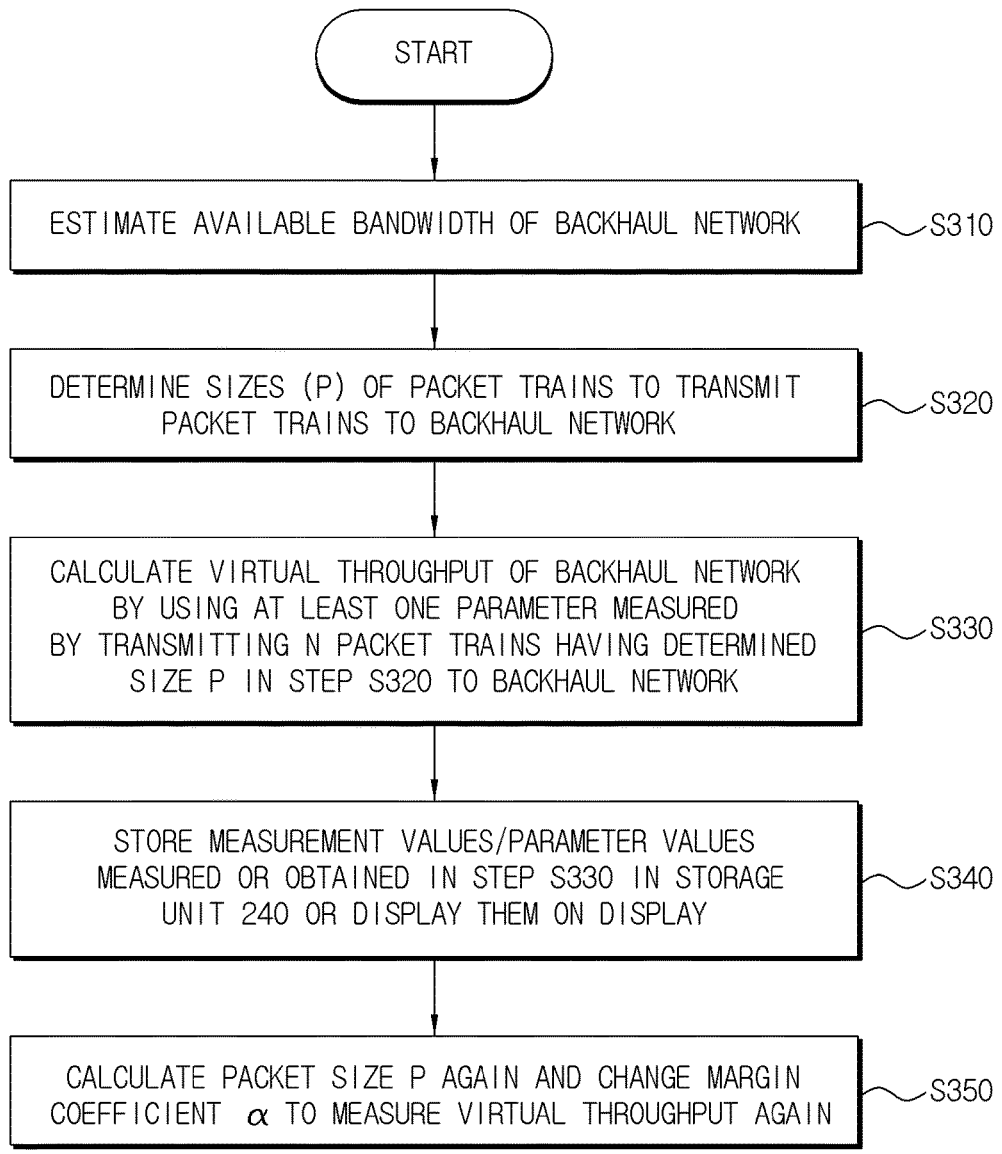
FIG. 3 is a view illustrating an embodiment of a method for measuring a throughput of a backhaul network according to the present invention.
Figure 4:
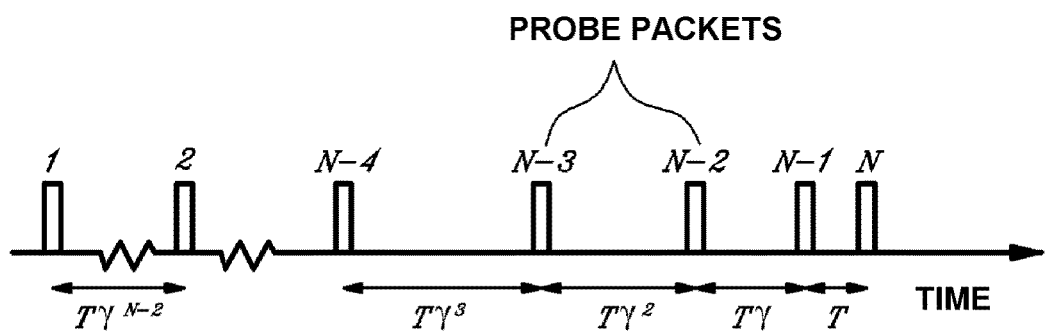
FIG. 4 is a view exemplifying a packet transmission scheme in a pathchirp manner.
Figure 5:
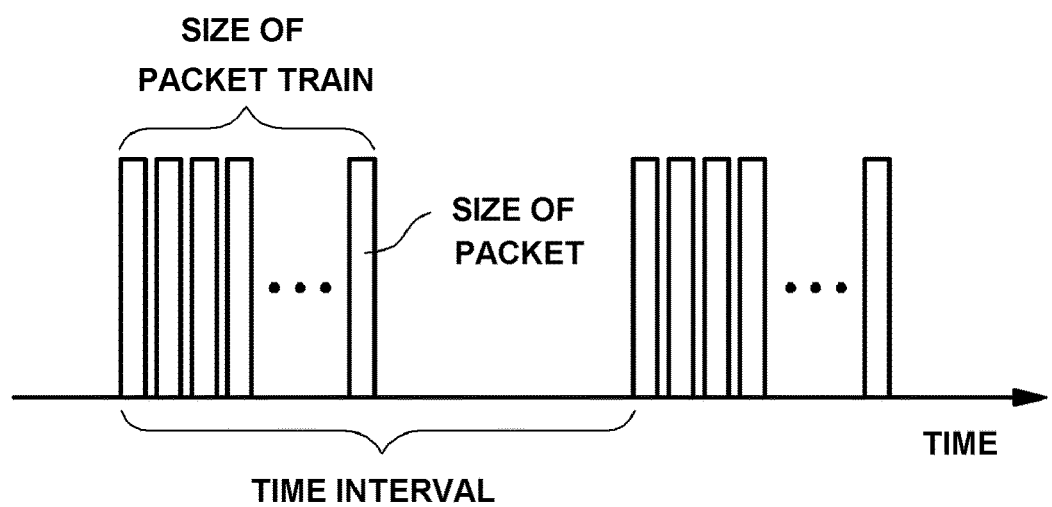
FIG. 5 is a view exemplifying a scheme of transmitting packet trains to measure a virtual throughput according to an embodiment of the present invention.
Figure 6:
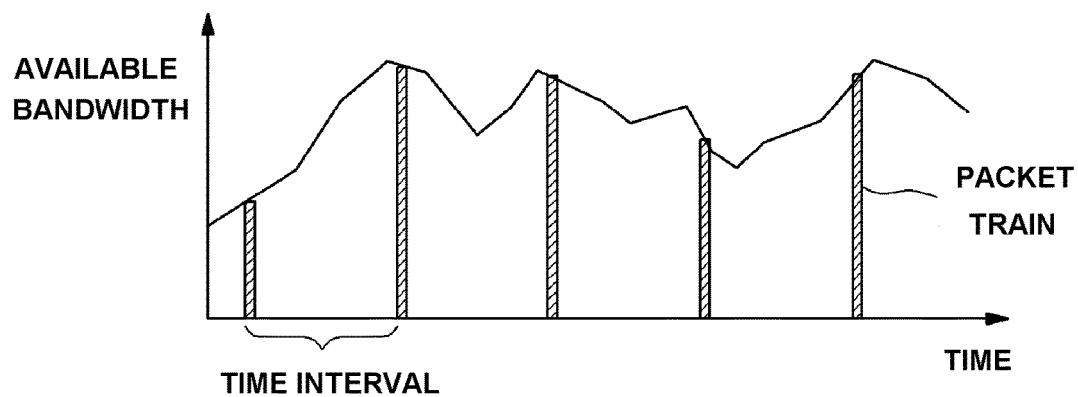
FIG. 6 is a view exemplifying a relationship between an available bandwidth of a network and packet trains transmitted to the network, which should be satisfied for preferable measurement of a virtual throughput of a network.
Figure 7:
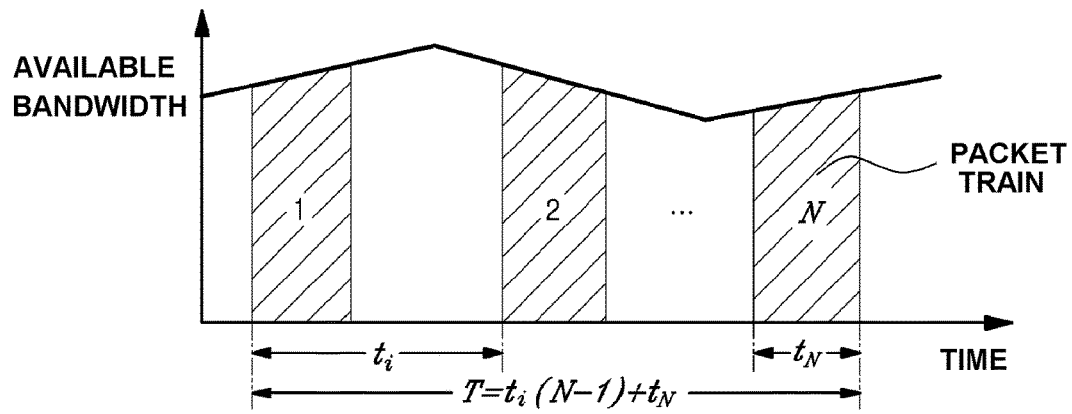
FIG. 7 is a view exemplifying, when N packet trains are transmitted to a backhaul network according to an embodiment of the present invention, a time interval from a transmission start time of one packet train to a transmission start time of a next packet train, a total time for which the N packet trains are transmitted, and a time period for which one packet train is transmitted.

FIG. 3 is a view illustrating an embodiment of a method for measuring a throughput of a backhaul network according to the present invention. FIG. 4 is a view exemplifying a packet transmission scheme in a pathchirp manner. FIG. 5 is a view exemplifying a scheme of transmitting packet trains to measure a virtual throughput according to an embodiment of the present invention. FIG. 6 is a view exemplifying a relationship between an available bandwidth of a network and packet trains transmitted to the network, which should be satisfied for preferable measurement of a throughput of a network. FIG. 7 is a view exemplifying, when N packet trains are transmitted to a backhaul network according to an embodiment of the present invention, a time interval from a transmission start time of one packet train to a transmission start time of a next packet train, a total time for which the N packet trains are transmitted, and a time period for which one packet train is transmitted. Hereinafter, an embodiment of the method for measuring a throughput of a backhaul network according to the present invention will be described with reference to FIGS. 3 to 7.

As illustrated, the method for measuring a throughput of a backhaul network according to an embodiment of the present invention starts in step S310 of estimating an available bandwidth of a backhaul network. In some implementations, the available bandwidth of the backhaul network may be estimated by using a pathchirp manner. In some implementations, the available bandwidth of the backhaul network may be also estimated by using a pathload manner or a iperf tool. As known, the pathchirp manner is an available bandwidth estimating technique using the self-induced congestion principle, and is a method for finding a minimum data transmission rate that generates congestions by using the fact that a packet delay increases when packets are transmitted at a transmission rate higher than the bandwidth that may be accommodated by a network and does not increase when packets are transmitted at a transmission rate lower than the bandwidth. As illustrated in FIG. 4, the pathchirp manner exponentially reduces transmission intervals between probe packets ($T\gamma_{N-1}$, ..., $T\gamma_3$, $T\gamma_2$, $T\gamma$, and T) and transmits the reduced transmission intervals to a reception end, thereby reducing a time period consumed to find the available bandwidth. Because the pathchirp manner generates a small amount of traffics as compared with the pathload manner that is another measurement manner based on self-induced congestion based technology or the iperf tool that maximally uses an available bandwidth, it may be advantageously applied to the present step of estimating an available bandwidth of a backhaul network in advance, but it is noted that it is not compulsory to use the pathchirp manner in the embodiment of the present step. The present step may be carried out by using the pathload manner, the iperf tool, or other known similar techniques.

In some implementations, the present step may be repeated M times ((here, M is a natural number that is equal to or greater than 1) to guarantee the objectiveness of the estimated value. In this case, a set $B=\{b_1, b_2, b_3, \ldots,$ and $b_M\}$ of the M available bandwidth estimation values may be obtained by carrying out the present step.

In the present step, the pathchirp manner using estimation of an available bandwidth of a backhaul network may not require preliminary information on a network, but accuracy may deteriorate as compared with a manner of directly measuring throughput. Accordingly, because the disclosed technology measures an approximate throughput (bandwidth) of a backhaul network by using a pathchirp manner or the like and uses the measured throughput only to determine a setting value necessary for carrying out a virtual throughput measuring procedure, which will be described below, an influence of the disadvantage of the pathchirp manner or the like can be reduced.

In step S320, the sizes P of the packet trains are determined to transmit the packet trains to the backhaul network (here, the packet trains refer to sets of packets). The sizes P of the packet trains may be determined by using at least one estimation value of the available bandwidths acquired in step S310. Here, the sizes P of the packet trains represent total data capacities of the packet trains.

The packet trains are transmitted to the backhaul network to measure a virtual throughput, and a virtual throughput refers to a throughput measured without using all traffic resources by transmitting packets that are sets of packets at a predetermined time interval as illustrated in FIG. 5, in order to reduce a load of a network due to traffics generated when throughputs are measured. All network resources are not used for the entire measurement time period to measure a virtual throughput, but the packets in the packet trains should be transmitted at a sufficiently rapid speed for a time period for which the packet trains are transmitted for measurement of the virtual throughput to instantaneously fill all the available bandwidths (see FIG. 6). If the sizes of the packet trains are not sufficiently large so that they do not influence the maximum throughput at a measurement time point, a measurement value smaller than the actual throughput of the network is obtained, but if the sizes of the packet trains are large, the measurement accuracy is improved but a larger number of network resources are used accordingly. Accordingly, it is important to properly set the sizes of the packet trains.

Now, a method for determining the sizes P of packet trains by using at least one estimation value of available bandwidths will be described in detail.

First, it is assumed that the number of times by which packet trains are transmitted for measurement of a virtual throughput is N (N is a natural number that is equal to or greater than 2), a time interval between times at which the packet trains are transmitted is $t_i$, a time period which is taken to transmit one packet train is $t_N$, and an entire measurement time period for which N packet trains are transmitted is T. As illustrated in FIG. 7, for example, the second packet trains may be transmitted after the selected time interval $t_i$ after the first packet trains is transmitted. In this case, an average data transmission rate $r_{avg}$ for the entire measurement time period T may be obtained in Equation 2 through Equation 1.

$$T = t_i(N-1) + t_N \quad (1)$$

$$r_{avg} = \frac{PN}{T} \quad (2)$$

Next, an intrusiveness I at which the measurement of a virtual throughput influences on a network will be defined as in Equation 3.

$$I = \frac{r_{avg}}{b} \quad (3)$$

In Equation 3, b is a throughput of the backhaul network that will be measured. By using Equation 3, for example, the sizes of packet trains according to an allowable intrusiveness $I_a$ ($0 < I_a < 1$) set by a backhaul network operator may be obtained in the following.

First, in step S310, a representative bandwidth $b_{rep}$ that represents elements $\{b_1, b_2, b_3, \ldots, b_M\}$ of a set B of M available bandwidth estimation values acquired by estimating M available bandwidths, and a value obtained by multiplying the representative bandwidth by a margin coefficient α is defined as a target measurement bandwidth b'. In some implementations, the representative bandwidth may be an average bandwidth $b_{avg}$ obtained by averaging the M available bandwidth estimation values. The representative bandwidth is multiplied by a margin coefficient to consider a change width of the backhaul throughput, but it will be noted that it is not essential to multiply the representative bandwidth by the margin coefficient α. In some implementations, it is also possible to define the representative bandwidth as a target measurement bandwidth b'. In summary, this relationship may be expressed in Equations 4 to 6.

$$B = \{b_1, b_2, b_3, \ldots, b_M\} \quad (4)$$

$$b_{rep} = E(B) \quad (5)$$

$$b' = b_{rep} \times \alpha, \ \alpha \geq 1.0 \quad (6)$$

Now, an allowable intrusiveness $I_a$ set by the backhaul network operator by using the target measurement bandwidth b' may be obtained as in Equation 7 similarly to Equation 3. The intrusiveness I is substituted by $I_a$ in Equation 3 because the size of a packet train at $I = I_a$ is sought, and b is substituted by b' because b is an unknown throughput of a backhaul network that will be measured and b' obtained from the available bandwidth estimation values acquired through a preliminary measurement of throughputs is used instead of the throughput of the backhaul network.

$$I_a = \frac{r_{avg}}{b'} = \frac{\frac{PN}{T}}{b'} = \frac{PN}{Tb'} \ N \geq 2 \quad (7)$$

Equation 8 may be obtained by using Equations 7 and 1.

$$\frac{b' I_a}{N} = \frac{P}{T} = \frac{P}{t_i(N-1) + t_N} \quad (8)$$

In this case, $t_N$ is a time period taken to transmit one packet train and may be assumed as in Equation 9.

$$t_N = \frac{P}{b'} \quad (9)$$

Equations 10 to 13 may be obtained by substituting Equation 8 with Equation 9.

$$\frac{b' I_a}{N} = \frac{P}{t_i(N-1) + \frac{P}{b'}} \quad (10)$$

$$\frac{N}{b' I_a} = \frac{t_i(N_1) + \frac{P}{b'}}{P} = \frac{t_i(N-1)}{P} + \frac{1}{b'} \quad (11)$$

$$\frac{N}{b' I_a} - \frac{1}{b'} = \frac{t_i(N-1)}{P} \quad (12)$$

$$P = \frac{b' I_a t_i(N-1)}{N - I_a} \quad (13)$$

Accordingly, the sizes of packet trains P may be obtained by using a target measurement bandwidth b', the number N of packet trains that will be transmitted to a backhaul network, the time interval $t_i$ between times at which the packet trains are transmitted, and an allowable intrusiveness $I_a$ of the backhaul network according to Equation 13.

Referring back to FIG. 3, in step S330, a virtual throughput of a backhaul network is calculated by using at least one parameter measured by transmitting N packet trains having the determined sizes, respectively in step S320. The N packet trains may be transmitted by transmitting a total of N packet trains having the sizes P one by one at the selected time interval $t_i$. The selected time interval $t_i$ may include an idle time period after one packet train is transmitted and before the next packet train is transmitted. As illustrated in FIG. 7, one packet train may be transmitted for a time period $t_N$ and a virtual throughput may be measured for a time period T.

In this step, a delay time ΔT taken until one packet train is transmitted to and received by the backhaul network may be measured and a value obtained by dividing the size P of the packet train by ΔT may be calculated as a virtual throughput of the backhaul network. In some implementations, N virtual throughputs may be calculated by measuring ΔTs for the N packet trains. In some implementations, an average virtual throughput value may be obtained by averaging the acquired N virtual throughputs. In some implementations, the maximum value and the minimum value of the acquired N virtual throughputs may be identified. In some implementations, the actual intrusiveness of the backhaul network may be obtained by substituting b of Equation 3 with the obtained average virtual throughput value or a specific virtual throughput value of the acquired N virtual throughputs.

In step S340, information on all or some of the N virtual throughputs measured in step S330, information on the average virtual throughput value, information on the maximum value or the minimum value of the N virtual throughputs, and information on the actual intrusiveness of the backhaul network may be stored in the storage unit 240 of the throughput measuring apparatus 140 and/or may be displayed on the display of the throughput measuring apparatus 140 for monitoring by the operator. In some implementations, all or some of a setting value for measuring a virtual throughput, that is, a measurement start time of a virtual throughput, a representative bandwidth brep of the M available bandwidth estimation values acquired in step S310 or an average bandwidth $b_{avg}$ obtained by averaging the M available bandwidth estimation values and a margin coefficient α may be stored in the storage unit 240 of the throughput measuring apparatus 140 and/or may be displayed on the display of the throughput measuring apparatus 140.

In step S350, the packet size P may be calculated again and the margin coefficient α in Equation 6 may be changed to measure a virtual throughput again. In this step, in the process of calculating a value obtained by dividing the maximum value $b_{VT\,max}$ of the throughput identified in step S330 by $b_{avg}$ and the size of a packet train in step S320, when it is determined that α is larger than the α used in advance, α is reduced when the size of the next packet train is calculated, and when it is determined that α is smaller, α is reduced, so that the value of α is corrected.

In the disclosed embodiments of the present invention, the arrangements of the constituent elements may be changed according to an environment or requirement in which the present invention is implemented. For example, some constituent elements may be omitted or integrated to implement one element. Further, the arrangement sequence or connection of some constituent elements may be changed.

Although various embodiments of the present invention have been illustrated and described, it is apparent that the present invention is not limited to the specific embodiments and may be variously modified by those skilled in the art to which the present invention pertains without departing from the essence of the present invention claimed in the claims and the modified embodiments should not be construed as being separate from the technical spirit or scope of the present invention. Accordingly, the technical scope of the present invention should be determined only according to the appended claims.

What is claimed is:

1. A method for measuring a throughput of a backhaul network, the method comprising:
    estimating an available bandwidth of a backhaul network;
    determining sizes (P) of packet trains by using the estimated available bandwidth; and
    calculating a virtual throughput of the backhaul network by using at least one parameter by transmitting N packet trains having the determined sizes to the backhaul network,
    wherein N is a natural number that is equal to or greater than 2,
    wherein estimating the available bandwidth of the backhaul network comprises obtaining M available bandwidth estimation values ($b_1, b_2, b_3, \ldots,$ and $b_M$) by estimating available bandwidths of the backhaul network M times,
    wherein M is a natural number that is equal to or greater than 1, and
    wherein determining the sizes (P) of packet trains comprises determining the sizes of the packet trains by using the M available bandwidth estimation values ($b_1$, $b_2, b_3, \ldots,$ and $b_m$), a selected time interval ($t_i$) from one transmission start time of a packet train to a transmission start time of the next packet train of the N packet trains, and an allowable intrusiveness ($l_a$) of the backhaul network.

2. The method of claim 1, wherein estimating the available bandwidth of the backhaul network comprises estimating the available bandwidth of the backhaul network by using a pathchirp manner.

3. The method of claim 1, wherein determining the size of the packet trains by using the M available bandwidth estimation values ($b_1, b_2, b_3, \ldots,$ and $b_m$), N, the selected time interval ($t_i$), and the allowable intrusiveness ($l_a$) of the backhaul network comprises obtaining a representative bandwidth value ($b_{rep}$) that represents the M available bandwidth estimation values ($b_1, b_2, b_3, \ldots,$ and $b_m$).

4. The method of claim 3, wherein determining the size of the packet trains by using the M available bandwidth estimation values ($b_1, b_2, b_3, \ldots,$ and $b_m$), N, the selected time interval ($t_i$), and the allowable intrusiveness ($l_a$) of the backhaul network further comprises determining the sizes (P) according to the following equation:

$$P = \frac{b_{rep} l_a t_i (N-1)}{N - l_a}.$$

5. The method of claim 3, wherein determining the size of the packet trains by using the M available bandwidth estimation values ($b_1, b_2, b_3, \ldots,$ and $b_m$), N, the selected time interval ($t_i$), and the allowable intrusiveness ($l_a$) of the backhaul network further comprises obtaining a target measurement bandwidth (b') by multiplying the representative bandwidth value ($b_{rep}$) and a margin coefficient (α), wherein α is a rational number that is equal to or greater than 1, and determining the sizes (P) of the packet trains according to the following equation:

$$P = \frac{b' l_a t_i (N-1)}{N - l_a}.$$

6. The method of claim 1, wherein calculating the virtual throughput of the backhaul network by using the at least one parameter by transmitting the N packet trains having the determined sizes to the backhaul network comprises calculating a value obtained by dividing (P) by a time period (ΔT) taken until a packet train is transmitted to and received by the backhaul network as a virtual throughput.

7. The method of claim 1, wherein calculating the virtual throughput of the backhaul network by using the at least one parameter by transmitting the N packet trains having the determined sizes to the backhaul network comprises:
    calculating values obtained by dividing P by time periods (ΔT) taken until the N packet trains are transmitted to and received by the backhaul network as virtual throughputs; and
    obtaining an average virtual throughput value obtained by averaging two or more virtual throughputs of the calculated N virtual throughputs.

8. The method of claim 7, further comprising:
    determining calculating a value obtained by dividing an average data transmission rate ($r_{avg}$) of the N packet trains by the average virtual throughput value as an intrusiveness (I) that influences on the backhaul network by the measurement of the throughput of the backhaul network.

9. The method of claim 3, wherein the representative bandwidth value ($b_{rep}$) is an average bandwidth value ($b_{avg}$) that is obtained by averaging the M available bandwidth estimation values ($b_1$, $b_2$, $b_3$, . . . , and $b_m$).

10. A method for determining a size of a packet train for measurement of a throughput of a backhaul network, the method comprising:
estimating an available bandwidth of a backhaul network;
determining sizes (P) of N packet trains using the estimated available bandwidth necessary for transmitting the packet trains to the backhaul network, wherein N is a natural number that is equal to or greater than 2,
calculating a virtual throughput of the backhaul network by using at least one parameter measured as the N packet trains having the determined sizes are transmitted to the backhaul network,
wherein determining the sizes (P) of the N packet trains comprises determining the sizes (P) of the N packet trains by using the estimated available bandwidth, N, a selected time interval ($t_i$) from one transmission start time of a packet train to a transmission start time of the next packet train of the N packet trains, and an allowable intrusiveness ($l_a$) of the backhaul network.

11. The method of claim 10, wherein estimating the available bandwidth of a backhaul network comprises obtaining M available bandwidth estimation values ($b_1$, $b_2$, $b_3$, . . . , and $b_M$) by estimating available bandwidths of the backhaul M times, wherein M is a natural number that is equal to or greater than 1, and
wherein determining the sizes (P) of the N packet trains further comprises:
obtaining an average bandwidth value (bavg) by averaging the M available bandwidth estimation values ($b_1$, $b_2$, $b_3$, . . . , and $b_M$),
obtaining a target measurement bandwidth (b') by multiplying the representative bandwidth value ($b_{rep}$) and a margin coefficient ($\alpha$), wherein $\alpha$ is a rational number that is equal to or greater than 1, and
determining the sizes (P) of the N packet trains according to the following equation $$P = \frac{b' l_a t_i (N-1)}{N - l_a}.$$

12. An apparatus for measuring a throughput of a backhaul network, the apparatus comprising:
a storage unit that stores information on the number (N) of packet trains that will be transmitted to the backhaul network, wherein N is a natural number that is equal to or greater than 2; and
a processor configured to estimate an available bandwidth of the backhaul network, to determine sizes (P) of the packet trains by using the estimated available bandwidth, and to calculate a virtual throughput of the backhaul network by using at least one parameter measured as the N packet trains having the determined sizes are transmitted to the backhaul network,
wherein the processor is further configured to obtain M available bandwidth estimation values ($b_1$, $b_2$, $b_3$, . . . , and $b_M$) by estimating available bandwidths of the backhaul network M times, wherein M is a natural number that is equal to or greater than 1,
wherein the storage unit further stores information on a selected time interval ($t_i$) from one transmission start time of a packet train to a transmission start time of the next packet train of the N packet trains, and an allowable intrusiveness ($l_a$) of the backhaul network, and
wherein the processor is further configured to determine the sizes of the N packet trains by using the M available bandwidth estimation values ($b_1$, $b_2$, $b_3$, . . . , and $b_m$), N, the selected time interval ($t_i$), and the allowable intrusiveness ($l_a$) of the backhaul.

13. The method of claim 12, wherein the processor is further configured to obtain an average bandwidth $b_{avg}$ by averaging the M available bandwidth estimation values ($b_1$, $b_2$, $b_3$, . . . , and $b_m$), to obtain a target measurement bandwidth b' by multiplying the average bandwidth value $b_{avg}$ and a margin coefficient ($\alpha$), wherein $\alpha$ is a rational number that is equal to or greater than 1, and to determine the sizes P of the N packet trains according to the following equation:

$$P = \frac{b' l_a t_i (N-1)}{N - l_a}.$$

14. The method of claim 12, wherein the processor is further configured to calculate a value obtained by dividing P by a time period ($\Delta T$) taken until a packet train is transmitted to and received by the backhaul network as a virtual throughput.

15. The method of claim 12, wherein the processor is further configured to calculate the values obtained by dividing P by time periods ($\Delta T$) taken until the N packet trains are transmitted to and received by the backhaul network as N virtual throughputs of the backhaul network, and to obtain an average virtual throughput value obtained by averaging two or more virtual throughputs of the calculated N virtual throughputs.

16. The method of claim 15, wherein the processor is further configured to determine calculating an average data transmission rate ($r_{avg}$) of the N packet trains by the average virtual throughput value as an intrusiveness (I) that influences on the backhaul network by the measurement of the throughput of the backhaul network.

* * * * *